United States Patent [19]
Keiser et al.

[11] Patent Number: 5,950,176
[45] Date of Patent: Sep. 7, 1999

[54] COMPUTER-IMPLEMENTED SECURITIES TRADING SYSTEM WITH A VIRTUAL SPECIALIST FUNCTION

[75] Inventors: Timothy Maxwell Keiser; Michael R. Burns, both of Los Angeles, Calif.

[73] Assignee: HSX, Inc., Los Angeles, Calif.

[21] Appl. No.: 08/620,906

[22] Filed: Mar. 25, 1996

[51] Int. Cl.⁶ .................................................. G06F 17/60
[52] U.S. Cl. ................................ 705/37; 705/36; 705/35
[58] Field of Search ........................................ 705/37, 36

[56] References Cited

U.S. PATENT DOCUMENTS

| | | | |
|---|---|---|---|
| 3,499,646 | 3/1970 | Burgess, Jr. et al. | 273/278 X |
| 3,573,747 | 4/1971 | Adam et al. | 705/37 |
| 3,581,072 | 5/1971 | Nymeyer | 705/37 |
| 4,412,287 | 10/1983 | Braddock, III | 705/37 |
| 4,597,046 | 6/1986 | Musmanno et al. | 705/36 |
| 4,674,044 | 6/1987 | Kalmus et al. | 705/37 |
| 4,903,201 | 2/1990 | Wagner | 705/37 |
| 4,980,826 | 12/1990 | Wagner | 705/37 |
| 5,077,665 | 12/1991 | Silverman et al. | 705/37 |
| 5,101,353 | 3/1992 | Lupien et al. | 705/37 |
| 5,136,501 | 8/1992 | Silverman et al. | 705/37 |
| 5,270,922 | 12/1993 | Higgins | 705/37 |
| 5,297,032 | 3/1994 | Trojan et al. | 705/37 |
| 5,375,055 | 12/1994 | Togher et al. | 705/37 |
| 5,508,913 | 4/1996 | Yamamoto et al. | 705/37 |
| 5,557,517 | 9/1996 | Daughterty, III | 705/37 |
| 5,689,652 | 11/1997 | Lupien et al. | 705/37 |
| 5,692,233 | 11/1997 | Garman | 705/37 |
| 5,727,165 | 3/1998 | Ordish et al. | 1/1 |
| 5,845,266 | 12/1998 | Lupien et al. | 705/37 |
| 5,905,974 | 5/1999 | Fraser et al. | 705/37 |

OTHER PUBLICATIONS

Chan, K.C. et al. "Market structure and the intraday pattern of bid–ask spreads for NASDAQ securities," The Journal of Business, v. 68, n. 1, p. 35–, Jan. 1995.

Howard, Barbara. "The trade: technology aims to take the final step," Institutional Investor, v. 25, n. 1, p. S15–, Jan. 1991.

Hakansson, Nils H. et al. "On the feasibility of automated market making by a programmed specialist," Journal of Finance, vol. XL, No. 1, pp. 1–20, Mar. 1985.

Lindsey, Richard R. and Ulrike Schaede. "*Specialist vs. Saitori*: market–making in New York and Tokyo," Financial Analysts Journal, v. 48, n. 4, pp. 48–57, Jul. 1992.

Freund, William C. "Trading stock around the clock: the future growth of global electronic markets," California Management Review, v. 34, n. 1, pp. 87–, 1991.

Bloomfield, Robert. "The interdependence of reporting discretion and informational efficiency in laboratory markets," The Accounting Review, v. 71, pp. 493–511, Oct. 1996.

*Primary Examiner*—Allen R. MacDonald
*Assistant Examiner*—Michele Stuckey Crecca
*Attorney, Agent, or Firm*—Brown Raysman Millstein Felder & Steiner LLP

[57] ABSTRACT

The present invention discloses a method, apparatus, and article of manufacture for a computer-implemented financial management system that permits the trading of securities via a network. A server computer receives buy and sell orders for derivative financial instruments from a plurality of client computers. The server computer matches the buy orders to the sell orders and then generates a market price through the use of a virtual specialist program executed by the server computer. The virtual specialist program responds to an imbalance in the matching of the buy and sell orders.

12 Claims, 4 Drawing Sheets

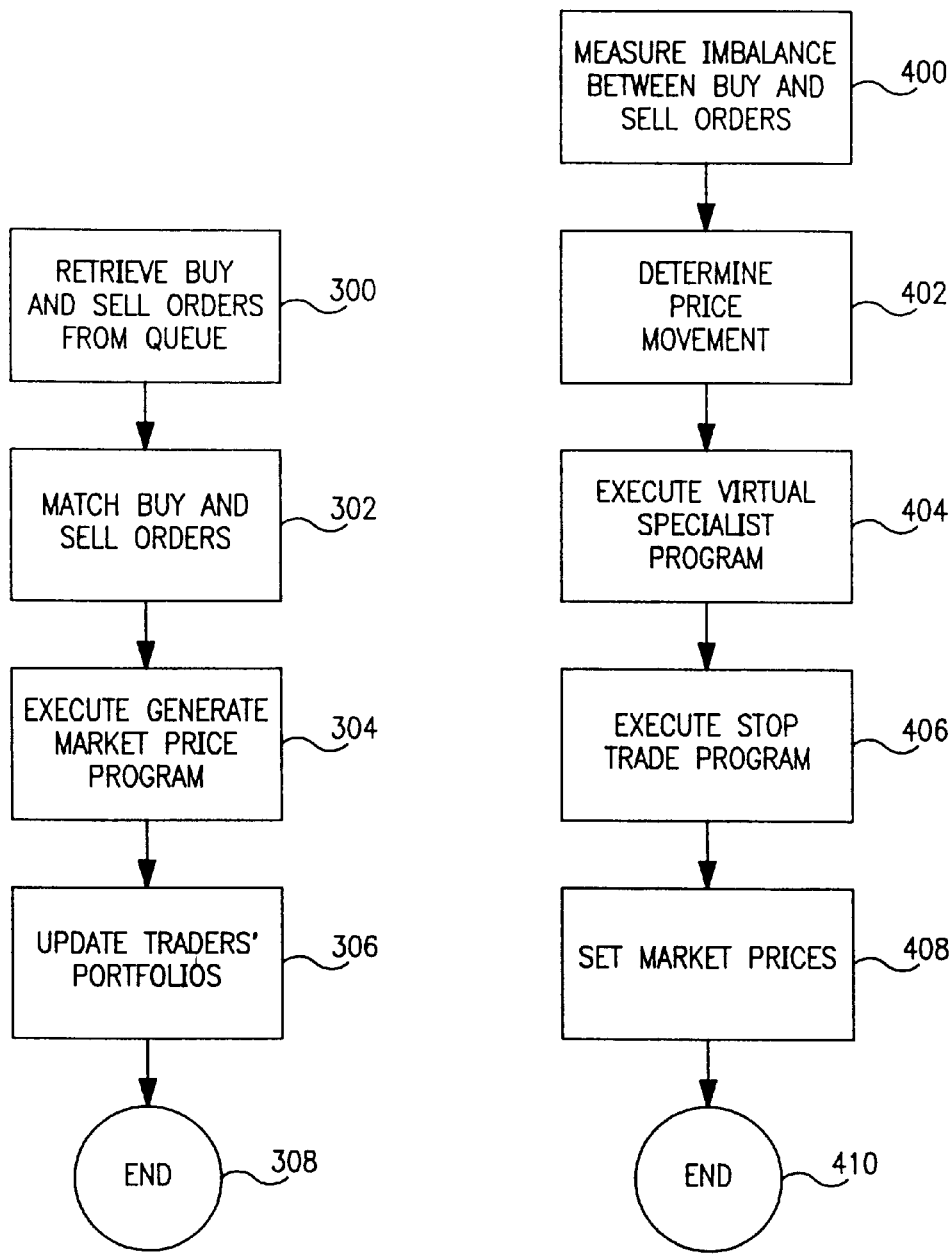

COMPUTER-IMPLEMENTED SECURITIES TRADING SYSTEM WITH A VIRTUAL SPECIALIST FUNCTION

BACKGROUND OF THE INVENTION

1. Field of the Invention

This invention relates in general to computer-implemented financial systems, and in particular to an improved automated securities trading system.

2. Description of Related Art

Computer-implemented securities trading systems are well known in the art. One such system is that disclosed U.S. Pat. No. 4,674,044, issued to Kalmus et al., entitled "Automated Securities Trading System", and incorporated by reference herein. These computer-implemented securities trading systems obtain bid and asked prices for securities from a database and then execute trades based on the bid and asked prices. However, there is generally still a human component to such systems.

For example, most financial markets also employ one or more market makers called "specialists." These specialists fill customer orders from the specialist's inventory position if there are no matches for the customer orders in the open market. In the prior art, the specialist function is not automated, but is performed by a firm or individual. Thus, there is a need in the art for an improved computer-implemented trading system that includes an automated specialist function to create a market for the securities traded and to lessen the volatility of smaller securities markets.

SUMMARY OF THE INVENTION

To overcome the limitations in the prior art described above, and to overcome other limitations that will become apparent upon reading and understanding the present specification, the present invention discloses method, apparatus, and article of manufacture for a computer-implemented financial management system that permits the trading of securities via a network. In accordance with the present invention, a server computer receives buy and sell orders for derivative financial instruments from a plurality of client computers. The server computer matches the buy orders to the sell orders and then generates a market price through the use of a virtual specialist program executed by the server computer. The virtual specialist program responds to an imbalance in the matching of the buy and sell orders.

An object of the present invention is to lessen the price volatility of derivative financial instruments traded in narrower markets.

A feature of the present invention is a virtual specialist program that engages in trading in the market to offset the price volatility and to provide liquidity to the market.

BRIEF DESCRIPTION OF THE DRAWINGS

Referring now to the drawings in which like reference numbers represent corresponding parts throughout:

FIG. 3 is a flowchart illustrating the logic of the pricing/trading program of the present invention;

FIG. 4 is a flowchart illustrating the logic of the generate market price program of the present invention;

DETAILED DESCRIPTION OF THE PREFERRED EMBODIMENT

Figure 1:
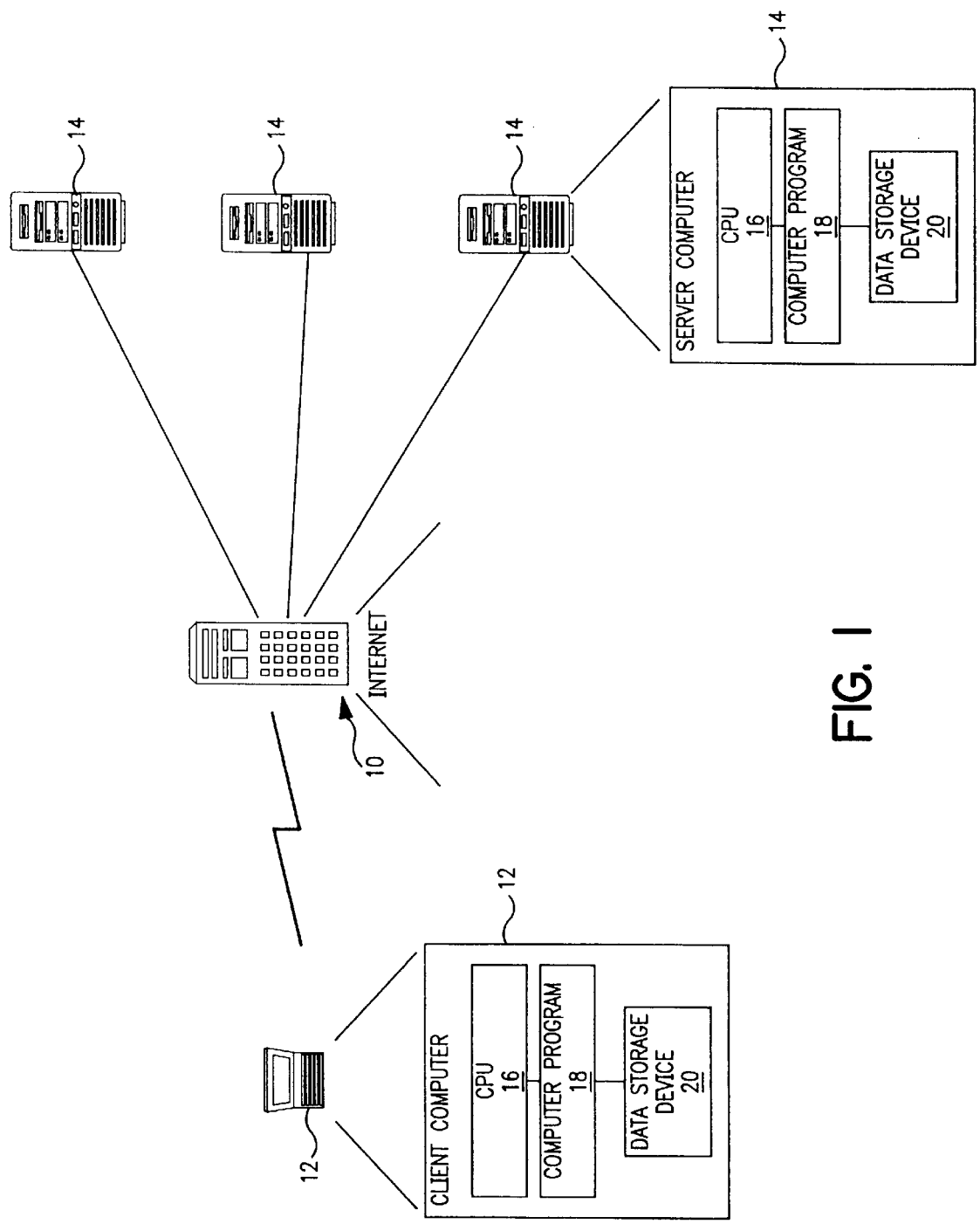
FIG. 1 is a block diagram of an exemplary hardware environment of the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention comprises a computer-implemented trading system for derivative financial instruments. The present invention accepts buy and sell orders from traders for the derivative financial instruments, sets a market price based on the supply and demand, and participates in the market as a trader in order to minimize price volatility. One preferred embodiment of the present invention is a computer-implemented "Hollywood Stock Exchange", which may be implemented as a simulation (i.e., game) or as an actual trading system for derivative financial instruments representing movies, talent, CDs, and television programs. These derivatives could be purchased with dollars or with a virtual currency known as "Hollywood dollars" which are controlled by a virtual reserve bank.

The derivative financial instruments are identified by a Current Trading List displayed for the traders that comprises a list of movies in various stages of production, talent, and other entertainment-oriented assets. The list contains:

- name of the derivative financial instrument;
- genre of the movie (action-adventure, mystery, western, comedy, etc.);
- production status (scripting, pre-production, filming, editing, release, home-video, etc.);
- number of shares in circulation;
- last trading price (printed every 15 minutes);
- price movement (i.e. ±Hollywood Dollars) since the previous midnight (PST);
- price movement since the previous mid-day;
- price movement year to date;

Traders are able to view the list sorted by:

- name, alphabetically;
- genre, alphabetically;
- production status, alphabetically;
- most active (number of shares traded yesterday);
- biggest gainers;
- biggest losers; and
- fastest movers today (e.g., fastest 20 movers up and fastest 20 movers down).

Similar information would be provided for other derivative financial instruments offered on the Hollywood Stock Exchange.

Each trader's portfolio is identified by a Portfolio data structure that comprises the trader's account status. This information includes:

- the amount of cash in the trader's account (paid interest at the system discount rate plus some increment, compounded daily);

current percentage rate paid to cash;

the total value of held stocks at the last selling price;

the total value of held bonds at the last selling price;

total portfolio value (TPV) (cash+bonds+stocks);

percentage of TPV in cash;

percentage of TPV in bonds; and percentage of TPV in stocks.

Traders can generate any number of different reports for display, including:

lists of stocks and bonds being traded (see above);

index of total Hollywood stocks (HSXI) expressed as a number, with 1000 defined as the aggregate total stock price value on opening day, wherein HSXI=(today's gross stock-value)/(opening day gross stock-value);

index of total Hollywood bonds (HBXI) expressed as a number, with 1000 defined as the aggregate total bond price value on opening day, wherein HBXI=((today's gross bond-value)/(opening day gross bond-value));

index of total Hollywood Stock Exchange (HMXI) comprised of all stocks and bonds, and expressed as a number, with 1000 defined as the aggregate total stock price value on opening clay, wherein HMXI=((today's gross market-value)/(opening day gross market-value));

lists of the top market performers, e.g., the top 10 traders in percentage portfolio growth calculated as net portfolio value–change=(% change of cash)+(% change of stocks)+(% change of bonds), and for each of the categories: yesterday (midnight to midnight), last week (7 days, ending midnight, each thursday), last month (closes at midnight last calendar day of month), last quarter (closes at midnight on last day of last month/quarter), year-to-date (running daily total of percentage value changes)/(days year-to-date), and annually (closes at midnight on December 31 each year);

overall market condition report, including a list of stopped issues with:

name;

last trading price;

time that stop-trade condition occurred;

percentage the issue actually moved on-the-day before the stop-trade;

number of total shares and/or bonds traded today;

dollar value of total trades today;

number of buy and sell trades today; and number of buy and sell trades this month.

Use of the above information will guide traders in making future buy and sell orders.

HARDWARE ENVIRONMENT

FIG. 1 is a block diagram that illustrates an exemplary hardware environment for the preferred embodiment of the present invention, and more particularly, illustrates a typical distributed computer system using the Internet 10 to connect client computers 12 executing for example, Web browsers, to server computers 14 executing a computer program embodying the present invention. A typical combination of resources may include client computers 12 that are personal computers or work stations connected via the Internet 10 to server computers 14 that are personal computers, work stations, minicomputers, or mainframes.

Generally, both the client computers 12 and the server computers 14 are comprised of one or more CPUs 16, various amounts of RAM 20 storing computer programs and other data, and other components typically found in computers. In addition, both the client computers 12 and the server computers 14 may include one or more monitors, and fixed or removable data storage devices 20 such as hard disk drives, floppy disk drives, and/or CD-ROM drives. Also included may be input devices such as mouse pointing devices and keyboards.

Both the client computers 12 and the server computers 14 operate under the control of an operating system, such as Windows, Macintosh, UNIX, etc. Further, both the client computers 12 and the server computers 14 each execute one or more computer programs 18 under the control of their respective operating systems. The present invention is preferably implemented as one or more computer programs 18 executed by the server computer 14, although in alternative embodiments these computer programs 18 may also be executed on the client computer 12.

Generally, the computer programs 18 implementing the present invention are tangibly embodied in a computer-readable medium, e.g. one or more of the fixed and/or removable data storage devices 20 attached to the computer. Under control of the operating system, the computer programs 18 may be loaded from the data storage devices 20 into the RAM of the computer for subsequent execution by the CPU 16. The computer programs 18 comprise instructions which, when read and executed by the computer, causes the computer to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

GENERAL LOGIC OF THE TRADING SYSTEM

Figure 2:
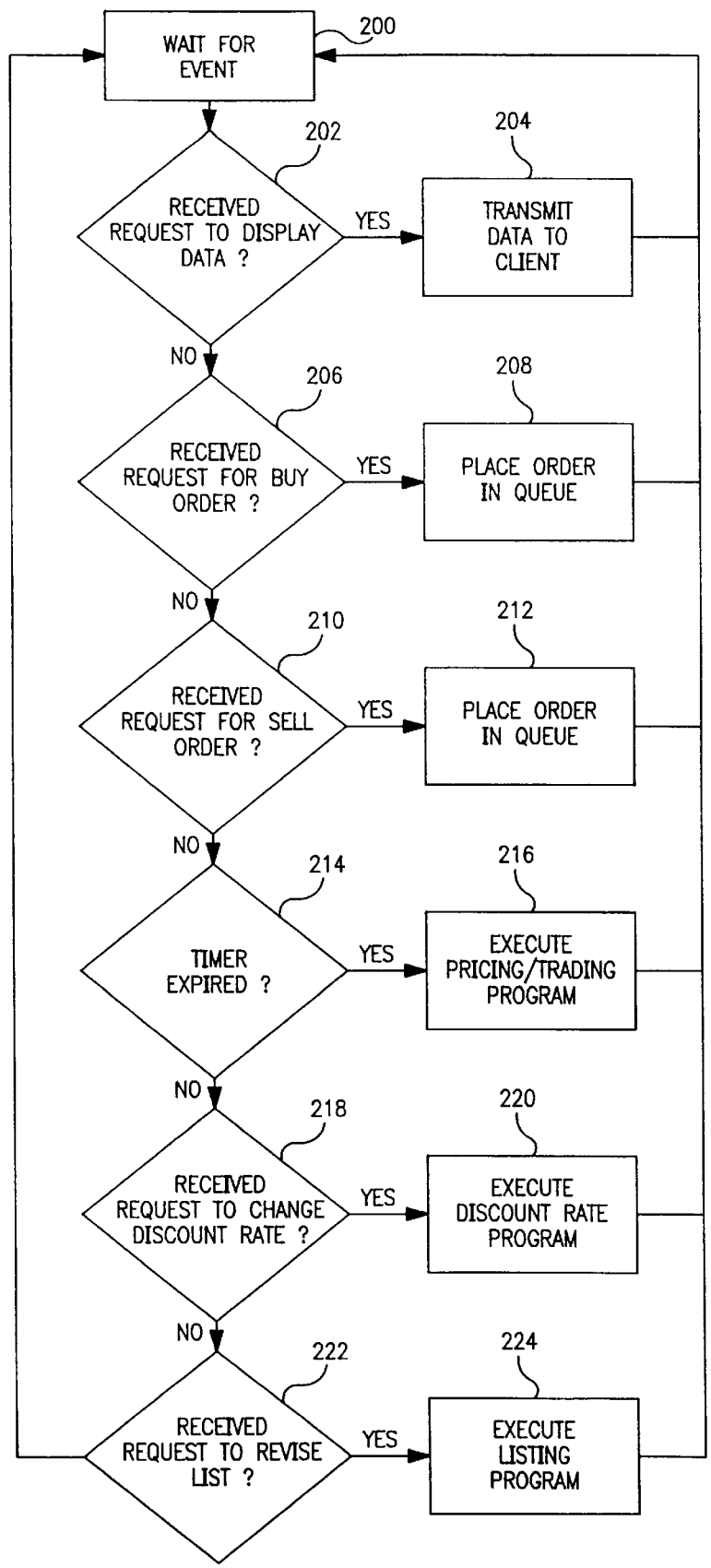
FIG. 2 is a flowchart illustrating the general logic of the present invention.

FIG. 2 is a flowchart illustrating the general logic of the present invention.

Block 200 represents the server computer 14 waiting for the next event to occur. Once the event occurs, control is transferred to blocks 202–224 to identify the event and respond accordingly.

Block 202 is a decision block that represents the server computer 14 determining whether it received a request to display data from the client computer 12. If so, block 204 represents the server computer 14 transmitting data to the client computer 12 for subsequent display. The data transmitted for display preferably includes at least three types of data: the current list of trading derivative financial instruments, the trader's portfolio, and other reports generated by the server computer 14.

Block 206 is a decision block that represents the server computer 14 determining whether it received a request to submit a buy order from the client computer 12 for a particular derivative financial instrument, e.g., stock or bond. If so, block 208 represents the server computer 14 processing the buy order by placing it in a queue in the memory of the server computer 14. The buy order is a data structure comprising:

trader's account number;

trader's name;

the time and date of the order;

the stock or bond to buy;

the cash balance in the trader's account;

a text-field where the trader may enter the total number to buy (generally in multiples of 100);

The buy order waits in the queue for the expiration of a predetermined "sweep pricing cycle". In the preferred embodiment, the sweep pricing cycle occurs every 15 minutes although other intervals could be used. The market price the trader actually pays for the derivative financial instrument is determined by the aggregate supply/demand for the derivative financial instrument at the end of the sweep pricing cycle during which the order was placed. The market price is set by the pricing/trading program executed by the server computer, which is described below in FIG. 3. The trader's account is then charged the market price for the derivative financial instrument. If the purchase uses up all available cash in the trader's account, the trader is "loaned" enough money to pay for the purchase, and their account is charged interest at a predetermined rate, e.g., 18% a year compounded daily, on the negative account balance. The interest is charged against the trader's account until they accumulate more cash to zero out the balance, either by selling stocks or buying dollars.

Block 210 is a decision block that represents the server computer 14 determining whether it received a request to submit a sell order from the client computer 12. If so, block 212 represents the server computer 14 processing the sell order by placing it in a queue in the memory of the server computer 14. The sell order is a data structure comprising:

- trader's account number;
- trader's name;
- the time and date of the order;
- the stock or bond to sell;
- the amount of the stock or bond in the trader's account;
- a text-field where the trader may enter the total number to sell (generally in multiples of 100);

Like the buy order, the sell order waits in the queue for the expiration of the predetermined sweep pricing cycle. The market price at which the trader actually sells the derivative financial instrument is determined by the aggregate supply/demand for the derivative financial instrument at the end of the sweep pricing cycle during which the order was placed. The market price is set by the pricing/trading program executed by the server computer, which is described below in FIG. 3. The trader's account is then credited with the market price for the derivative financial instrument.

The sell order can be either produced by a trader or generated by the server computer 14, as will be explained in more detail below. For a sell order produced by a trader, the trader views a list of stocks or bonds owned by the trader on a monitor attached to the client computer and chooses to sell a quantity at the market price.

When the trader requests to view the list of stocks, the server computer 14 transmits certain information to the client computer 12 for display, including, for each stock owned, the last trading price (LTP), the quantity of stocks, the purchase price, and the date purchased. Similarly, when viewing the list of bonds, the server computer 14 transmits certain information to the client computer 12 for display, including, for each bond owned, the last trading price (LTP), the interest rate being earned for each kind of bond, the quantity of bonds, the purchase price, and the date purchased.

Block 214 is a decision block that represents the server computer 14 determining whether an internal timer for the sweep pricing cycle has expired. If so, block 216 represents the server computer 14 processing the timer by executing a pricing/trading program as described in FIG. 3.

Block 218 is a decision block that represents the server computer 14 determining whether it received a request to change the discount rate. If so, block 220 represents the server computer 14 executing a discount rate program. In order to add or subtract liquidity, the server computer 14 occasionally steps in to act as a virtual reserve bank and adjust the discount rate. The discount rate is adjusted based on the performance of the specific industry of the market. For the Hollywood Stock Exchange, the discount rate is adjusted to add or subtract liquidity to affect the growth of the entertainment industry. When the server computer 14 lowers the discount, all the bonds seem to be a better deal, because the bonds are paying a fixed rate interest that never changes. This encourages traders to buy more bonds, and this surge in buying demand causes a correlated increase in bond prices as described above. The same thing happens to stocks, because traders are making less money on the interest being paid on the cash balance in their trading account. When the server computer 14 raises the discount, the bonds seem to be a worse deal, since their advantage over the discount is smaller. Thus, the server computer 14 relaxes the buying pressures or demands for bonds, which should result in additional sell orders, or at least slow the buying of bonds, thus decreasing their prices as they trade in the market. Likewise, stocks seem less attractive, since traders could make more money by keeping cash in their accounts and getting interest on it.

Block 222 is a decision block that represents the server computer 14 determining whether it received a request to revise the derivative list. If so, block 224 represents the server computer 14 executing a listing program. The server computer 14 determines whether the list of derivatives trading in the system should be revised. The list could be revised to reflect new derivative offerings, expired derivatives, and delisted derivatives.

When a new derivative is offered, the price is based on the derivative's potential value. For example, for a new stock offering, which represents a movie on the Hollywood Stock Exchange, the initial price of the stock could be based on the movie's potential box office revenue. For a bond offering, which represents talent on the Hollywood Bond Exchange, the price of the bond could be based on the Hollywood Reporter's Star Power Index. A bond representing a talent with a low Star Power Index of 15 would be issued with a higher yield than a bond representing a talent with a high Star Power Index rating.

A warrant with a strike price is attached to the new derivative when it is offered. When the derivative and warrant are first issued, the warrant is of no value until the strike price is reached. For a stock, the strike price could be reached after the movie has grossed a certain level of revenue. When a derivative is delisted from the exchange, a stock due to the movie ending its production run or a talent due to retirement or death, for example, the warrants are called and the traders are paid the value of the warrants, thus providing off-balance sheet financing for studios.

PRICING/TRADING PROGRAM

FIG. 3 is a flowchart illustrating the logic of the pricing/trading program of the present invention. Block 300 represents the server computer 14 retrieving the buy and sell orders that have accumulated in the queue during the period since the prior sweep pricing cycle. Block 302 represents the server computer 14 matching the buy orders with the sell orders, although it is likely that an identical number of buy and sell orders would not have accumulated in the queue during the period. Block 304 represents the server computer 14 executing the generate market price program described in FIG. 4 to determine the market price for the derivative financial instruments. After the market price is determined, block 306 represents the server computer 14 updating the traders' portfolios to reflect the buy and sell orders in the queue being processed at the market price. Block 308 represents the end of the pricing/trading program.

GENERATE MARKET PRICE PROGRAM

FIG. 4 is a flowchart illustrating the logic of the generate market price program of the present invention. One purpose of the generate market price logic is to generate a market price for a derivative financial instrument that reflects the demand or lack of demand for the derivative financial instrument in the market. Block 400 represents the server computer 14 measuring the imbalance between the buy and sell orders during the period since the prior sweep pricing cycle. Block 402 represents the server computer 14 determining the price movement of a derivative financial instrument caused by the imbalance in buy and sell orders. Block 404 represents the server computer 14 executing a virtual specialist program as described in FIG. 5 to provide stability and liquidity to the market. Block 406 represents the server computer 14 executing the stop trade program, as described in FIG. 6, to stop trading in a derivative financial instrument if the projected price movement is excessive during the trading day and threatens the integrity of the market for that instrument. Block 408 represents the server computer 14 setting the market price, which becomes the price the pricing/trading program uses to update the traders' portfolios. Block 410 represents the end of the generate market price program.

In measuring the imbalance between buy and sell orders, as represented by block 400, the absolute difference between the number of sells and the number of buys is defined as the net movement in sweep (NMS). A sweep increment variable (SIV) is defined as the increase or decrease in price caused by an incremental imbalance in the number of buy orders and sell orders. A lot movement variable (LMV) represents the incremental lot size that will result in a price increase or decrease of one SIV. The projected price movement (PM) can be expressed as:

$$PM=(NMS/LMV)*SIV.$$

For example, with 42,000 buy orders and 30,000 sell orders for a particular stock, the NMS=(42,000−30,000)= 12,000. With SIV=$0.25 and LMV=5000, the price movement of the particular stock will be (12,000/5,000)*0.25= $0.50. Thus, the market price of the particular stock will be $0.50 greater than the last trading price.

One can easily see that, with such a pricing scheme, there is the potential for great volatility in the price of a derivative financial instrument and the eventual loss of investor confidence in the market mechanism. In exchanges such as the Hollywood Stock Exchange, it would be possible for one or more individuals to pursue trading strategies that would purposely cause drastic price fluctuations.

In order to encourage growth and stability in the capital market regulated by the trading system of the present invention, a virtual specialist program is executed by the server computer, as represented by block 404 in FIG. 4. In executing the virtual specialist program, the server computer 14 regulates the trading by actively trading in the market out of a virtual specialist portfolio (VSP). The virtual specialist portfolio initially contains half of all the issued shares of each derivative financial instrument.

VIRTUAL SPECIALIST PROGRAM

Figure 5:
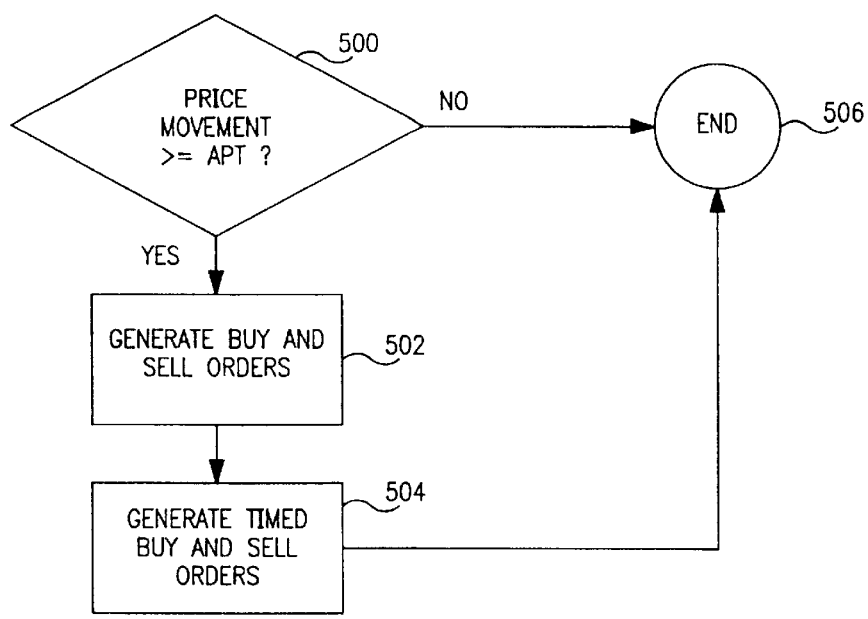
FIG. 5 is a flow diagram illustrating the logic of the virtual specialist program of the present invention.

FIG. 5 is a flow diagram illustrating the logic of the virtual specialist program of the present invention. Block 500 is a decision block that represents the server computer 14 determining whether or not the price movement during the sweep pricing cycle is greater or equal to an adjusted price movement threshold (APT). The APT is a constant in the memory of the server computer 14. If the APT is greater than the price movement, then the server computer 14 does not trade in the market. If the price movement is greater than or equal to the APT, then the server computer 14 trades out of a virtual specialist portfolio. The level of trading by the server computer 14 is determined by the amount that the price movement exceeded the APT. The greater the price movement, the more shares the server computer 14 trades to offset the price movement.

In an exemplary embodiment of the present invention, the ATP=1.25 and the server computer 14 performs the following steps: if PM=APT then the server computer 14 matches 20% of unmatched shares; if PM=APT+0.25 then the server computer 14 matches 20%of unmatched shares; if PM=APT+0.50 then the server computer 14 matches 30% of unmatched shares; if PM=APT+0.75 then the server computer 14 matches 40% of unmatched shares; if PM=APT+ 1.0 then the server computer 14 matches 50% of unmatched shares; if PM=APT+1.25 then the server computer 14 matches 60% of unmatched shares; if PM=APT+1.50 then the server computer 14 matches 70% of unmatched shares; or if PM=APT+1.75 then the server computer 14 matches 80% of unmatched shares.

Block 502 represents the server computer 14 generating a buy or a sell order to offset the price movement. The buy or sell order generated by the server computer 14 is placed in the queue with the trader buy and sell orders to be processed during the next sweep cycle.

Since the virtual specialist portfolio initially includes half of all the securities traded, the server computer 14 could eventually deplete the virtual specialist portfolio or cause the virtual specialist portfolio to own all the shares of a stock. In order to maintain a balanced virtual specialist portfolio, and provide some liquidity to the market, the server computer 14 generates additional buy and sell orders to offset orders generated in response to the price movement exceeding the APT. Block 504 represents the server computer 14 generating timed buy and sell orders. In one embodiment of the invention, the server computer 14 assess each stock and each bond in the virtual specialist portfolio. The server computer 14 determines the deficit or surplus in the item, and then place 1/288th of the deficit as a "timed recovery order" into each successive 15 minute segment for the next 3 days. When the pricing/trading program 255 matches buy and sell orders as represented by block 320, the pricing/trading program 255 includes any "timed recovery orders" outstanding for the last 3 days in the sweep. These orders are matched with the traders' buy and sell orders. Block 506 represents the end of the virtual specialist program.

STOP TRADING PROGRAM

Figure 6:
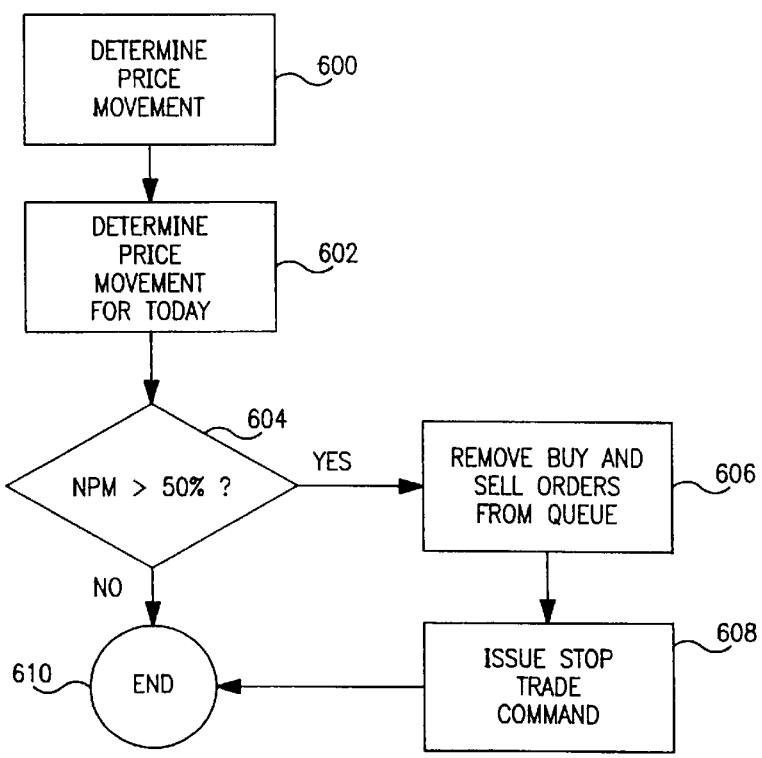
FIG. 6 is a flow diagram illustrating the logic of the stop trading program of the present invention.

FIG. 6 is a flow diagram illustrating the logic of the stop trading program of the present invention. Block 600 represents the server computer 14 determining the price movement of a stock caused by the imbalance in buy and sell orders. Block 602 represents the server computer 14 measuring the price movement on the day, not just during the sweep cycle period. Block 604 is a decision block that represents the server computer 14 determining whether the net price movement (NPM) within one "trading day" (i.e., midnight-midnight) is greater than 50% up or down. As represented by block 606, the buy and sell orders are removed from the queue if the net price movement is greater than 50% for a stock trading above $20. At that point, the trading in that issue is stopped within the 15 minute period until further notice. All orders (buy and sell) for that stock during this sweep are unfilled. The trading has stopped due to "excessive order imbalance".

For example, assume that the Last Trading Price (LTP) for "Rambo-17" is $67 (+7.5 on-the-day). During one 15-minute sweep pricing cycle, the server computer 24 receives buy orders for 655,000 shares of "Rambo-17". Also, the server computer 14 receives sell orders for 35,000 shares of "Rambo-17". The server computer 14 evaluates the price movement for the sweep pricing cycle, and tests it to see if the net projected price movement "on-the-day" is greater than 50%. If it would be greater than 50%, it stops trading in that instrument only. In this example, there is a net order-imbalance of 620,000 shares, which would create an up movement in price of (+620,000/5000)*$0.25=+$31.00. Since the total movement on the day would be the $7.50 so far plus the additional $31.00, the net projected price movement on the day would be $31.00+$7.50=$38.50. If the opening price that day was $59.50, the percentage projected price movement for the day is $38.50/$59.50=64%. Since the projected net price movement would be greater than 50%, the trading is stopped for that instrument. If the projected price movement was less than 50%, the price of the instrument would be adjusted accordingly and trade in that stock continued. Block 608 represents the STOP TRADE order that issues regarding the particular stock. Traders who issued a buy or sell order for the stock are notified that the order has not been filled due to excessive order imbalance during the trading day. Finally, block 610 represents the end of the stop trading program.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for regulating market price in a computerized trading system, the system receiving buy orders and sell orders for an instrument, the method comprising:

measuring an imbalance between buy orders and sell orders for the instrument received over a given period;

computing a projected price movement based on the measured imbalance between the number of buy and sell orders;

setting a market price for the instrument based upon the received buy and sell orders and the measured imbalance; and automatically generating additional buy orders or sell orders for the instrument at the market price to guarantee execution of some or all of the received buy or sell orders if the projected price movement is greater than or equals a predetermined price movement threshold.

2. The method of claim 1, wherein the step of measuring the imbalance comprises computing an absolute difference between the number of buy orders and the number of sell orders.

3. The method of claim 2, wherein the projected price movement is computed from the difference and stored variables.

4. The method of claim 3, wherein the stored variables include a sweep increment variable and a lot movement variable.

5. The method of claim 3, wherein the step of computing the projected price movement comprises computing the projected price movement using the following equation:

$$PM=(NMS/LMV)*SIV,$$

where PM represents the projected price movement, NMS represents the absolute difference between the number of buy and sell orders, LMV represents the lot movement variable, and SIV represents the sweep increment variable.

6. The method of claim 1, further comprising generating a number of additional orders in direct proportion to an amount by which the projected price movement exceeds the predetermined price movement threshold.

7. A computerized method for regulating market price in a computerized trading system that receives buy orders and sell orders for an instrument, the method comprising:

measuring an imbalance between buy and sell orders received for the instrument over a plurality of periods;

computing a projected price movement for each of the periods based on the measured imbalance between the number of buy and sell orders;

computing a total price movement in the instrument for the plurality of periods based upon the projected price movement during the periods; and stopping trading activity in the instrument if the computed total price movement exceeds an excessive order threshold.

8. The method of claim 7, comprising computing the excessive order threshold from an opening market price for the instrument determined prior to the plurality of periods.

9. The method of claim 8, wherein the step of computing the excessive order threshold comprises computing the excessive order threshold as 50% of the opening market price for the instrument.

10. The method of claim 1, wherein the step of automatically generating additional buy and sell orders comprises automatically generating orders to guarantee execution of all of the received buy and sell orders.

11. A computer-readable storage medium for storing program code means for, when executed, causing a computer to perform a computerized method for regulating market price in a computerized trading system that receives buy orders and sell orders for an instrument, the method comprising:

measuring an imbalance between buy and sell orders received for the instrument over a plurality of periods;

computing a projected price movement for each of the periods based on the measured imbalance between the number of buy and sell orders;

computing a total price movement in the instrument for the plurality of periods based upon the projected price movement during the periods; and stopping trading activity in the instrument if the computed total price movement exceeds an excessive order threshold.

12. A computer-readable storage medium for storing program code means for, when executed, causing a computer to perform a computerized method for regulating market price in a computerized trading system that receives buy orders and sell orders for an instrument, the method comprising:

measuring an imbalance between buy and sell orders received for the instrument over a plurality of periods;

computing a projected price movement for each of the periods based on the measured imbalance between the number of buy and sell orders;

computing a total price movement in the instrument for the plurality of periods based upon the projected price movement during the periods; and stopping trading activity in the instrument if the computed total price movement exceeds an excessive order threshold.

\* \* \* \* \*